United States Patent
Wong et al.

(10) Patent No.: US 10,194,330 B2
(45) Date of Patent: Jan. 29, 2019

(54) COMMUNICATION TECHNIQUES

(71) Applicant: Alcatel Lucent, Boulogne Billancourt (FR)

(72) Inventors: Shin Horng Wong, Chippenham (GB); Seau Sian Lim, Swindon (GB); Matthew Baker, Milton (GB)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/115,471

(22) PCT Filed: Jan. 13, 2015

(86) PCT No.: PCT/EP2015/050452
§ 371 (c)(1),
(2) Date: Jul. 29, 2016

(87) PCT Pub. No.: WO2015/113808
PCT Pub. Date: Aug. 6, 2015

(65) Prior Publication Data
US 2017/0181009 A1    Jun. 22, 2017

(30) Foreign Application Priority Data
Jan. 30, 2014    (EP) .................................... 14305125

(51) Int. Cl.
*H04L 1/00*  (2006.01)
*H04W 16/26*  (2009.01)
(Continued)

(52) U.S. Cl.
CPC .......... *H04W 16/26* (2013.01); *H04L 1/0003* (2013.01); *H04L 1/0033* (2013.01); *H04L 1/08* (2013.01); *H04L 1/189* (2013.01); *H04W 4/70* (2018.02)

(58) Field of Classification Search
CPC .................................................. H04W 16/26
(Continued)

(56) References Cited

U.S. PATENT DOCUMENTS

2005/0276242 A1  12/2005  Goto
2009/0247209 A1  10/2009  Cho
(Continued)

FOREIGN PATENT DOCUMENTS

CN    1411187    4/2003
CN    1411228    4/2003
(Continued)

OTHER PUBLICATIONS

ZTE, "Discussion on Traffic Control Coverage Improvement," $3^{rd}$ Generation Partnership Project (3GPP), 3GPP TSG RAN WG1 Meeting #75, R1-135362, 6 pages, XP050735044, San Francisco, USA, Nov. 11-15, 2013.
(Continued)

*Primary Examiner* — Shripal K Khajuria
(74) *Attorney, Agent, or Firm* — Fay Sharpe LLP

(57) ABSTRACT

Aspects provide methods for controlling user equipment operation in a wireless communications network configured to support communication with the user equipment according to a communication mode which utilizes repetition of messaging; computer program products and network nodes operable to perform those methods. One method comprises: determining a modulation and coding regime to be used by the user equipment; identifying a repetition regime to be implemented by the user equipment in conjunction with the modulation and coding regime; and communicating an indication of the determined modulation and coding regime and identified repetition regime to the user equipment. Aspects recognize that when implementing a coverage enhanced region within a network it is possible that fixed repetition levels can be defined for CE-MTC UE. Those fixed repetition levels can be implemented by a network and recognize differences between the CE-MTC UE radio condition. That is to say, the number of repetitions used may correspond to
(Continued)

radio condition being experienced at a machine-type communication device: those in poorer coverage regions will be selected to receive a greater number of repetitions than those in a better radio coverage region. The granularity of such repetition levels may subject to a given operator's implementation of a coverage enhanced region. The first aspect recognizes that it is possible to implement varying repetition levels for user equipment operating in the coverage enhanced region supported by a network access node. Those varying repetition levels can be configured at the network access node; for example, an eNodeB.

25 Claims, 1 Drawing Sheet

(51) Int. Cl.
    *H04L 1/08*     (2006.01)
    *H04L 1/18*     (2006.01)
    *H04W 4/70*     (2018.01)

(58) Field of Classification Search
    USPC .......................................................... 370/329
    See application file for complete search history.

(56) References Cited

U.S. PATENT DOCUMENTS

| | | |
|---|---|---|
| 2010/0142630 A1 | 6/2010 | Kuri |
| 2013/0315218 A1 | 11/2013 | Cheong |

FOREIGN PATENT DOCUMENTS

| | | |
|---|---|---|
| JP | 2005-252886 | 9/2005 |
| RU | 2474074 | 1/2013 |
| RU | 2476010 | 2/2013 |
| RU | 2012110922 | 10/2013 |
| UA | 98199 | 4/2012 |
| WO | 2007/013561 | 2/2007 |
| WO | 2013/056741 | 4/2013 |
| WO | WO 2013/056741 A1 | 4/2013 |
| WO | 2013/167288 | 11/2013 |

OTHER PUBLICATIONS

Renesas Mobile Europe Ltd, "Physical channels coverage enhancements for MTC," 3$^{rd}$ Generation Partnership Project (3GPP), 3GPP TSG RAN WG1 Meeting #72, R1-130423, 6 pages, XP050663706, St. Julian's, Malta, Jan. 28-Feb. 1, 2013.
New Postcom, "Proposals on Down Link Coverage Enhancement for Low Cost MTC," 3$^{rd}$ Generation Partnership Project (3GPP), 3GPP TSG RAN WG1 Meeting #72, R1-130194, 3 pages, XP050663361, St. Julian's, Malta, Jan. 28-Feb. 1, 2013.
Alcatel-Lucent et al., "Feasibility of coverage extension of physical channels for MTC devices," 3$^{rd}$ Generation Partnership Project (3GPP), 3GPP TSG-RAN WG1 Meeting #72, R1-130462, 7 pages, XP050663744, St. Julian's, Malta, Jan. 28-Feb. 1, 2013.
International Search Report for PCT/EP2015/050452 dated Apr. 9, 2015.
Nokia Siemens Networks, Nokia, PDSCH/PUSCH Coverage Enhancement Performance Results for MTC[online], 3GPP TSG-RAN WG1#72b R1-131228, Internet <URL:http://www.3gpp.org/ftp/tsg_ran/WG1_RL1/TSGR1_72b/Docs/R1-131228.zip>, Apr. 2013.

| Repetition Index | Repetition Level 1 | Repetition Level 2 | Repetition Level 3 |
|---|---|---|---|
| 0 | $R_{10}$ | $R_{20}$ | $R_{30}$ |
| 1 | $R_{11}$ | $R_{21}$ | $R_{31}$ |
| 2 | $R_{12}$ | $R_{22}$ | $R_{32}$ |
| 3 | $R_{13}$ | $R_{23}$ | $R_{33}$ |
| 4 | $R_{14}$ | $R_{24}$ | $R_{34}$ |
| 5 | $R_{15}$ | $R_{25}$ | $R_{35}$ |
| 6 | $R_{16}$ | $R_{26}$ | $R_{36}$ |
| 7 | $R_{17}$ | $R_{27}$ | $R_{37}$ |

COMMUNICATION TECHNIQUES

FIELD OF THE INVENTION

There are provided methods of controlling user equipment operation in a wireless communications network configured to support communication with the user equipment according to a communication mode which utilises repetition of messaging; computer program products and network nodes operable to perform those methods.

BACKGROUND

Wireless telecommunications systems are known. In a cellular system, radio coverage is provided to user equipment, for example, mobile phones, in areas known as cells. A base station is located in each cell to provide radio coverage. User equipment in each cell receives information and data from a base station and can be operable to transmit information and data to the base station.

Information and data transmitted by a base station to user equipment occurs on channels of radio carriers known as downlink channels. Information and data transmitted by user equipment to the base station occurs on channels of radio carriers known as uplink channels. Although the deployment of base stations is largely controlled or controllable by a network operator, the deployment of user equipment is not. The unplanned deployment of user equipment within a network can cause unexpected consequences.

Accordingly, it is desired to provide techniques for communicating with user equipment in a network.

SUMMARY

A first aspect provides a method of controlling user equipment operation in a wireless communications network configured to support communication with the user equipment according to a communication mode which utilises repetition of messaging; the method comprising: determining a modulation and coding regime to be used by the user equipment; identifying a repetition regime to be implemented by the user equipment in conjunction with the modulation and coding regime; and communicating an indication of the determined modulation and coding regime and identified repetition regime to the user equipment.

The first aspect recognises that one issue which may occur in the deployment of user equipment within a network is that they can become deployed in areas suffering from very high attenuation. Such high attenuation can cause user equipment to be unable to decode downlink information which can be essential for being able to access appropriate downlink traffic. If deployed in such areas of high attenuation, user equipment may be effectively unable to receive traffic from a base station.

The first aspect recognises that techniques for providing information to user equipment in high attenuation deployments exist. The first aspect also recognises that there is an emerging class of user equipment (such as machine type communication devices which may be used on Smart meters) which tend to be substantially immobile, or have relatively low mobility once installed and thus, although typical mobile user equipment may simply find it inconvenient when located in high attenuation areas and yet have restored coverage when the user equipment moves to a lower attenuation, such immobile user equipment may be permanently, or long-term located in a region of high attenuation where no network coverage may be provided for those users, or where network coverage is very poor.

Techniques for ensuring some kind of communication can occur for substantially immobile user equipment located in high attenuation areas typically comprise, for example, implementing a different communication technique at a supporting base station. Such different communication techniques may comprise, for example, use of large numbers of repetitions of transmissions of a single message such that user equipment located in a high attenuation area have an opportunity to receive and re-compile that message. That is to say, by repeating transmission of messaging, network nodes involved in communication may be operable to combine successive repetitions in order to increase the likelihood that a message can be decoded. Such repetitions may be used to increase coverage provided in areas of high attenuation.

A Machine Type Communication (MTC) device is one type of low mobility user equipment. MTC-UE may be used by machine for a specific operation. One example of such an MTC device would be a Smart utility meter. As described, some such devices may be located in areas of particularly high attenuation; for example, in basements which suffer from high penetration loss. It can therefore be difficult for those MTC devices to communicate with a network. Coverage enhancement techniques aim to extend coverage provided to such MTC user equipment by approximately 15 dB. Such coverage enhanced user equipment are referred to as CE-MTC UE (Coverage Enhanced MTC UE). In order to extend coverage to such user equipment, the network must be operable without extending total transmission power of a base station (for example, an eNode B) or the total transmission power of user equipment. Repetition has been identified as the main method. That is to say, repetition represents a means to extend coverage to user equipment in a particularly high attenuation area. The number of required repetitions is significant and may be in the hundreds. Such a level of repetition has significant impact on the spectral efficiency of a network. It will be understood that a network has to provide repeat SIBs (System Information Broadcast messages) and reserve additional RACH resources when operating in coverage extension mode.

A region of network coverage provided by a base station, or network access node, which lies outside a normal region of radio coverage and only offers support to user equipment as a result of repetition techniques may typically be referred to as a coverage enhanced region.

The first aspect recognises that when implementing a coverage enhanced region it is possible that several repetition levels can be defined for CE-MTC UE. Those fixed repetition levels can be implemented by a network and recognise differences between the CE-MTC UE radio condition. That is to say, the number of repetitions used may correspond to radio condition being experienced at a machine-type communication device: those in poorer coverage regions will be selected to receive a greater number of repetitions than those in a better radio coverage region.

The granularity of such repetition levels may subject to a given operator's implementation of a coverage enhanced region. The first aspect recognises that it is possible to implement varying repetition levels for user equipment operating in the coverage enhanced region supported by a network access node. Those varying repetition levels can be configured at the network access node; for example, an eNodeB.

When selecting repetition levels in respect of control messaging carried by downlink control channels, for example, it will be understood that such messages typically have a fixed modulation and coding scheme (MCS) for substantially immobile user equipment operating in a coverage enhanced region, that coding scheme being selected to offer very high reliability.

However, the first aspect recognises that it may be beneficial, for scheduling reasons and flexibility, for data messages and messages carried on data channels (for example, PDSCH and PUSCH), even for user equipment operating in the coverage enhanced region, that a modulation and coding scheme can be implemented which may not be fixed. As a result, repetition levels required to support such a variable communication scheme may also need to be flexible.

The first aspect recognises that by allowing use of different modulation and coding schemes in relation to data channels a degree of flexibility can be provided to an eNodeB scheduler which may allow intelligent choices to be made in relation to scheduling for substantially immobile user equipment operating in the coverage enhanced region. The first aspect recognises that whilst having different modulation and coding schemes (MCS) can provide flexibility to an e-node B scheduler, different MCS schemes may require different numbers of repetitions to support user equipment experiencing different radio condition. The first aspect provides a means by which changes to a number of repetitions being implemented in relation to a given user equipment can be supported when a modulation and coding scheme is selected in relation to that user equipment whilst not significantly increasing signalling overhead.

Aspects recognise that it is possible to perform changes to repetition level or modulation and coding schemes in relation to, for example, CE-MTC UE by utilising a control channel and associated control signalling sent to user equipment in the coverage enhanced region. That control channel signalling may be carried on, for example, an (E)PDCCH.

Accordingly, a method according to the first aspect may provide a means of controlling user equipment operation in a wireless communications network configured to support communication with the user equipment according to a communication mode which utilises repetition of messaging. Such a communication mode may comprise a mode which recognises user equipment and a wireless network access node may only be in communication if repetition of signalling is employed.

A method according to the first aspect may comprise: determining a modulation and coding regime to be used by the user equipment. Accordingly, a modulation and coding regime suited to, for example, detected radio condition and/or available resource may be selected for communication with user equipment. Such a modulation and coding regime (MCR) may be chosen in order to balance the disparate requirements of increased throughput and increased reliability of communication.

A method according to the first aspect may comprise: identifying a repetition regime to be implemented by the user equipment in conjunction with the modulation and coding regime. Accordingly, to assist in balancing the requirements of increased throughput and increased reliability of communication, a repetition regime, comprising the number of repeated transmissions of a given message may be selected to support a chosen MCR.

A method according to the first aspect may comprise: communicating an indication of the determined modulation and coding regime and identified repetition regime to the user equipment. Accordingly, nodes which may be in communication are made aware of a communication regime to be implemented, to assist with successful decoding and/or combinations of multiple versions of the same message.

In one embodiment, the indication of the identified repetition regime is encoded using one or more bits of a modulation and coding regime control message. Accordingly, it will be appreciated that operation in a communication mode which requires use of repetition may limit sensible choices of MCS. Bits are provided within existing system messages to support a wide range of available MCS. If the number of choices is essentially reduced, some bits of the message may be reused to signal a repetition regime to user equipment. It will be appreciated that some, or all of the available bits in existing MCS messages may be reused to give an indication of a repetition regime to be implemented. For example, it is possible to implement a scheme where a subset of available bits are used for MCS and some, or all, of the remaining bits are used to signal a repetition regime. Similarly, some or all, of the MCS bits may be used to indicate, a combination of MCS and repetition regime to be used, as a codebook look up. Furthermore, one or more bits of available MCS messaging may be combined with other bits in other messages to indicate a repetition regime.

In one embodiment, the indication of the identified repetition regime is encoded using one or more bits of a user equipment transmit power control message. Accordingly, it will be appreciated that that operation in a communication mode which requires use of repetition may limit sensible choices of transmit power and that transmit power control commands may be substantially unused or that only some of all available commands may be of use. Bits are provided within existing system messages to support a wide range of available transmit power control messaging. If the number of choices is essentially reduced, some bits of power control message(s) may be reused to signal a repetition regime to user equipment.

Accordingly, the first aspect recognises that that some of the fields in downlink control information messaging may be substantially irrelevant to user equipment operating in a coverage extension mode and that those fields are not required for CE mode operation and can therefore be reused.

In one embodiment, the indication comprises: an indication of an absolute number of repetitions to be performed. In one embodiment, the indication comprises: an indication of a codebook entry giving an absolute number of repetitions to be performed. In one embodiment, the indication comprises: an indication of a codebook entry giving an absolute number of repetitions to be performed and a modulation and coding regime to be applied. According to one embodiment, some or all of the coding points in the modulation and coding scheme field within the downlink control information message can be used to indicate a number of repetitions to be implemented by a network in relation to a given MTC-UE. Typically, CE-MTC UE are likely to require fewer modulation encoding system levels (MCS levels) and, thus, it will be appreciated that fewer code points are required to indicate the MCS to CE-MTC UE. The remaining code points can therefore be used to indicate the number of repetitions to be used in relation to data transport; for example, the number of repetitions in PDSCH and PUSCH. It will, of course, be appreciated that the signalling need not be such that it explicitly conveys an absolute number of repetitions but can be used to signal an index; for example, a repetition index which can point to a code book indicating an absolute number of repetitions.

In one embodiment, the repetition regime comprises a repetition regime to be applied in relation to uplink transmissions made by the user equipment. In one embodiment, the repetition regime comprises a repetition regime to be applied in relation to downlink transmissions received by the user equipment. Accordingly, flexibility may be provides to user equipment using a communication mode dependent upon repetition. It will be understood that a repetition level implemented for a CE-MTC UE may be set to be implemented by user equipment (and a network) such that it changes a number of repetitions used for all channels rather than just PDSCH and PUSCH for a specific MCS. Such an embodiment offers an opportunity to an eNodeB to change repetition level of other channels by means of a mechanism operating at the physical layer.

In one embodiment, determining the modulation and coding regime comprises assessing radio condition being experienced by the user equipment and selecting the modulation and coding regime in dependence upon the assessed radio condition.

In one embodiment, the communication mode which utilises repetition of messaging comprises: messaging techniques used to provide radio coverage in a coverage enhanced region. In one embodiment, the user equipment comprises a coverage extension machine type communication device. Accordingly, the technique of aspects and embodiments described may be of particular use in supporting substantially immobile user equipment in regions of poor typical radio coverage.

A second aspect provides a computer program product operable, when executed on a computer, to perform the method of the first aspect.

A third aspect provides a network node operable to control user equipment operation in a wireless communications network configured to support communication with the user equipment according to a communication mode which utilises repetition of messaging; the network node comprising: transmission regime logic operable to determine a modulation and coding regime to be used by the user equipment; repetition logic operable to identify a repetition regime to be implemented by the user equipment in conjunction with the modulation and coding regime; and communication logic operable to communicate an indication of the determined modulation and coding regime and identified repetition regime to the user equipment.

In one embodiment, the network node comprises a network control or access node, for example, an eNodeB or equivalent.

In one embodiment, the indication of the identified repetition regime is encoded using one or more bits of a modulation and coding regime control message.

In one embodiment, the network node comprises a base station. Accordingly, the network node may comprise, for example, an eNodeB.

In one embodiment, the indication of the identified repetition regime is encoded using one or more bits of a user equipment transmit power control message.

In one embodiment, the indication comprises: an indication of an absolute number of repetitions to be performed.

In one embodiment, the indication comprises: an indication of a codebook entry giving an absolute number of repetitions to be performed.

In one embodiment, the indication comprises: an indication of a codebook entry giving an absolute number of repetitions to be performed and a modulation and coding regime to be applied.

In one embodiment, the repetition regime comprises a repetition regime to be applied in relation to uplink transmissions made by the user equipment.

In one embodiment, the communication mode which utilises repetition of messaging comprises: messaging techniques used to provide radio coverage in a coverage enhanced region.

In one embodiment, the user equipment comprises a coverage extension machine type communication device.

A fourth aspect provides a method of controlling user equipment operation in a wireless communications network configured to support communication with the user equipment according to a communication mode which utilises repetition of messaging; the method comprising: receiving an indication of a determined modulation and coding regime and identified repetition regime to be used by the user equipment; the modulation and coding regime to be used by the user equipment having been determined by a network control node; and the repetition regime to be implemented by the user equipment having been identified for use by the user equipment in conjunction with the determined modulation and coding regime; and communicating in dependence upon the received indication. Accordingly, a method is provided such that received transmissions made according to the first aspect may be successfully interpreted. It will be understood that, for example, user equipment operating in a coverage enhanced region may be instructed to reinterpret messaging which might otherwise be provided to support normal user equipment operation.

In one embodiment, the indication of the identified repetition regime is encoded using one or more bits of a modulation and coding regime control message.

In one embodiment, the indication of the identified repetition regime is encoded using one or more bits of a user equipment transmit power control message.

In one embodiment, the indication comprises: an indication of an absolute number of repetitions to be performed.

In one embodiment, the indication comprises: an indication of a codebook entry giving an absolute number of repetitions to be performed.

In one embodiment, the indication comprises: an indication of a codebook entry giving an absolute number of repetitions to be performed and a modulation and coding regime to be applied.

In one embodiment, the repetition regime comprises a repetition regime to be applied in relation to uplink transmissions made by the user equipment. In one embodiment, the repetition regime comprises a repetition regime to be applied in relation to downlink transmissions received by the user equipment.

In one embodiment, the communication mode which utilises repetition of messaging comprises: messaging techniques used to provide radio coverage in a coverage enhanced region.

In one embodiment, the user equipment comprises a coverage extension machine type communication device.

A fifth aspect provides a computer program product operable, when executed on a computer, to perform the method of the fourth aspect.

A sixth aspect provides user equipment operable to perform a control method in a wireless communications network configured to support communication with the user equipment according to a communication mode which utilises repetition of messaging; the user equipment comprising: reception logic operable to receive an indication of a determined modulation and coding regime and identified repetition regime to be used by the user equipment; the modulation and coding regime to be used by the user equipment having been determined by a network control node; and the repetition regime to be implemented by the user equipment having been identified for use by the user equipment in conjunction with the determined modulation and coding regime; and communication logic operable to transmit in dependence upon the received indication.

In some embodiments, user equipment may be operable to transmit uplink communication and receive downlink communication in dependence upon the received indication.

In one embodiment, the indication of the identified repetition regime is encoded using one or more bits of a modulation and coding regime control message.

In one embodiment, the indication of the identified repetition regime is encoded using one or more bits of a user equipment transmit power control message.

In one embodiment, the indication comprises: an indication of an absolute number of repetitions to be performed.

In one embodiment, the indication comprises: an indication of a codebook entry giving an absolute number of repetitions to be performed.

In one embodiment, the indication comprises: an indication of a codebook entry giving an absolute number of repetitions to be performed and a modulation and coding regime to be applied.

In one embodiment, the repetition regime comprises a repetition regime to be applied in relation to uplink transmissions made by the user equipment.

In one embodiment, the communication mode which utilises repetition of messaging comprises: messaging techniques used to provide radio coverage in a coverage enhanced region.

In one embodiment, the user equipment comprises a coverage extension machine type communication device.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figures 1, 2:
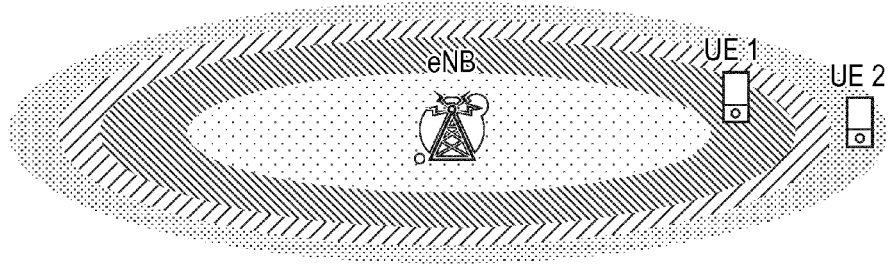
FIG. 1 illustrates schematically implementation of a coverage extension region supported by an e-node B.
FIG. 2 is a table illustrating repetition levels and repetition indexes.

As mentioned above, one difficulty with deploying some types of user equipment is that they are located in areas which suffer from high losses; for example, high penetration losses due to their position within a building. Therefore, it is difficult for those user equipment to communicate with a network. One example of such user equipment is a Machine Type Communication device typically used by a machine such as, for example, a Smart utility meter. Some such Smart utility meters may be located in basements or other areas which suffer from high attenuation of radio signals. It will be understood that those user equipment are substantially static and are unlikely to move to a region suffering from less attenuation. Some of those Smart utility meters operate in such a manner that it is desired to extend the coverage of those devices by 15 dB. According to the operation of some networks, a base station may be operable to perform a special mode of operation at periods of low network traffic. That special mode of operation, known as coverage enhancement, is such that messages sent to users in regions of very high attenuation are repeated a number of times. In particular, some messages may be repeated a number of times within a radio frame of a downlink transmission channel. Repeating messaging enables energy and information from successive repetitions to be combined in order to improve the likelihood of user equipment being able to decode information contained in such a message. However, in order to achieve coverage in very high penetration loss areas, the extent of repetition within a radio frame may result in virtually the whole resource of the radio frame over a 40 ms window being required to be used for transmissions of, for example, a master information block, particularly for a narrow bandwidth carrier.

Before discussing the embodiments in any more detail, first an overview will be provided.

Aspects and embodiments recognise that it is possible to reuse fields which already exist in downlink control information messaging to allow an eNodeB or network to communicate with an MTC device in a coverage extension region. Some of the fields in, for example, existing downlink control information messaging can be used to indicate the number of repetitions which are to be implemented and such reuse of fields can avoid introduction of additional signalling bits.

Such arrangements recognise that some of the fields in downlink control information messaging may be substantially irrelevant to user equipment operating in a coverage extension mode and that those fields are not required for CE mode operation and can therefore be reused.

According to one embodiment, some or all of the coding points in the modulation and coding scheme field within the downlink control information message can be used to indicate a number of repetitions to be implemented by a network in relation to a given MTC-UE. Typically, CE-MTC UE are likely to require fewer modulation encoding system levels (MCS levels) and, thus, it will be appreciated that fewer code points are required to indicate the MCS to CE-MTC UE. The remaining code points can therefore be used to indicate the number of repetitions to be used in relation to data transport; for example, the number of repetitions in PDSCH and PUSCH. It will, of course, be appreciated that the signalling need not be such that it explicitly conveys an absolute number of repetitions but can be used to signal an index; for example, a repetition index which can point to a code book indicating an absolute number of repetitions.

According to one embodiment, a power control command for PUSCH (in DCI format 0 or UL grant in RAR) and PDSCH (in DCI format 1A) can be reinterpreted as a repetition index. Such a scenario recognises that a CE-MTC UE operating in CE mode is likely to be using maximum power for all uplink transmissions and, hence, the need for power control commands from an e-node B may be largely obsolete. As a result, power control signalling may be reinterpreted or re-used to allow communication of a desired repetition index to be implemented by a CE-MTC UE.

It will be appreciated that use of some bits in existing MCS signalling and/or info bits in power control command signalling can be used to provide large numbers of information bits to indicate a repetition index to a CE-MTC UE.

According to another embodiment, a repetition level can be indicated to a CE-MTC UE by using information bits in existing MCS fields and/or power control command fields in DCI and/or RAR signalling. It will be understood that a repetition level implemented for a CE-MTC UE may be set to be implemented by user equipment (and a network) such that it changes a number of repetitions used for all channels rather than just PDSCH and PUSCH for a specific MCS. Such an embodiment offers an opportunity to an e-node B to change repetition level of other channels by means of a mechanism operating at the physical layer.

According to one embodiment, the existing MCS field can be maintained and used as it is intended; that is to say, all the information bits used in the MCS message can be used for MSC signalling. However, the number of repetitions can be derived from the MCS via a one-to-one mapping; for example, via a look-up table. According to such an embodiment, a CE-MTC UE may be operable to obtain an MCS for use, for example, in relation to PDSCH and PUSCH and would be operable to refer to a look-up table according to which the indication of MCS would act as an index to a table that points to the number of repetitions to be used in PDSCH and PUSCH signalling. It will be appreciated that, in one extreme, all bits in the MCS field are used and many repetition levels can therefore be implemented. However, such a look-up table may also be implemented in relation to a case where only some of the available MCS bits are used and an appropriate look-up table implemented. Such an arrangement recognises that unused MCS bits may be used for purposes other than to indicate repetition index to a CE-MTC UE.

According to one embodiment, the MCS and/or power control command information field in DCI format 1A is used to indicate repetition index in relation to PDSCH.

In another embodiment, the MCS and/or power control command information field in DCI format 1A is used to indicate the repetition level for all downlink channels.

In another embodiment, the MCS and/or power control command information field in DCI format 0 or RAR is used to indicate the repetition index for PUSCH.

In one embodiment, the MCS and/or power control command info bit in DCI format 0 or RAR is used to indicate the repetition level for all uplink channels.

It will be appreciated that a number of information bits used to indicate repetition index is advantageously sufficiently large to cover a number of different coverage levels and different possible modulation coding schemes likely to be implemented by user equipment operating in the coverage extension region. If insufficient bits are available it may be possible for an e-node B to configure user equipment operating in coverage extension mode at a higher level of signalling. According to such an arrangement, the repetition index in different repetition levels would have a different number of repetitions; that is to say, in FIG. 1 where UE1 and UE2 are in repetitions levels 1 and 3 respectively, if a repetition index is signalled to UE1 and UE2 using the same MCS then the number of repetitions implemented in relation to UE1 would be smaller than that implemented in relation to UE2.

It will be appreciated that if sufficient bits are available to indicate a specific repetition index such that all repetition levels and modulation encoding schemes can be represented, then there may be no need to configure a repetition level for PDSCH and PUSCH.

Example 1

If it is assumed that in one implementation:
1) DCI Format 0 and DCI Format 1A are the only two DCIs used by CE-MTC UE;
2) There are three repetition levels that can be configured at an eNB; and
3) 4 bits are required for MCS for CE-MTC UE.

In some systems, 5 bits are used for MCS signalling and 2 bits are used for power control commands in a DCI in downlink control information signalling. Since in the example given 4 bits are used for signalling MCS, the total "free" bits remaining to indicate repetition index are 3, which allows such a system to report 8 repetition indices which can be related to 8 different repetition levels.

FIG. 2 illustrates schematically a repetition index scheme for implementing one possible set of repetition levels. In the example shown in Table 2, a repetition index is indicated in the DCI and the repetition level is configured by an e-node B. An absolute number of repetitions $R_{jk}$ can therefore be found by knowing the repetition level and the indicated repetition index in the downlink control information messaging. It will be appreciated that not all values of $R_{jk}$ may necessarily be different.

As described generally in relation to aspects and embodiments previously, DCI format 0 can be used to indicate the number of repetitions for PUSCH, whilst DCI format 1A can be used to indicate the number of repetitions for PDSCH.

In general, it will be appreciated that if 20 MCS levels need to be indicated then that would require 20 of the available 32 code points in an existing MCS field. Remaining code points of the MCS field, together with up to 4 code points in the transmit power control field, may be used to indicate repetition level to CE-MTC UE. That is to say, a total of 128 combinations of MCS and repetition level can be indicated to user equipment.

It will be appreciated that apart from the downlink control information (DCI) (format 1A, format 0) carried by the PDCCH and EPDCCH, MCS information may be communicated in a RAR (Random Access Response) message. Such a message may be carried by the PDSCH. The RAR is the message sent to a UE in response to a preamble sent by the UE when that UE tries to access the network. Arrangements may recognize that after receiving the RAR a UE may be operable to send an uplink message called Message 3 to an eNB. The resource and format (MCS, allocation etc) and power control information of Message 3 is indicated in the RAR. Embodiments recognize that the MCS and/or power control bits included in a RAR can be used to indicate a repetition index or repetition level to be used in relation to the uplink transmission by user equipment of Message 3. It will be appreciated that typically the number of bits for MCS and TPC in RAR are: MCS=4 bits and TPC (power control)=3 bits.

Aspects and embodiments recognize that bits carried in, for example, fields relating to MCS and Power Control may be reused to encode information relating to repetition levels to user equipment operating in a coverage enhanced region. Such fields may be included in DCI, which can be carried on an (E)PDCCH. Similarly, such fields may be included in RAR messaging which can be carried on a PDSCH.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling user equipment operation in a wireless communications network configured to support communication with said user equipment according to a communication mode which utilises repetition of messaging; said method comprising:
   determining a modulation and coding regime to be used by said user equipment;
   identifying a repetition regime to be implemented by said user equipment in conjunction with said modulation and coding regime; and
   communicating an indication of said determined modulation and coding regime and identified repetition regime to said user equipment;
   wherein said indication comprises: an indication of an absolute number of repetitions to be performed; and
   wherein said indication comprises: an indication of a codebook entry giving the absolute number of repetitions to be performed.

2. A method according to claim 1, in which said indication of said identified repetition regime is encoded using one or more bits of a modulation and coding regime control message.

3. A method according to claim 1, in which said indication of said identified repetition regime is encoded using one or more bits of a user equipment transmit power control message.

4. A method according to claim 1, wherein said indication further comprises: a modulation and coding regime to be applied.

5. A method according to claim 1, wherein said repetition regime comprises a repetition regime to be applied in relation to uplink transmissions made by said user equipment.

6. A method according to claim 1, wherein determining said modulation and coding regime comprises assessing radio condition being experienced by said user equipment and selecting said modulation and coding regime in dependence upon said assessed radio condition.

7. A method according to claim 1, wherein said communication mode which utilises repetition of messaging comprises: messaging techniques used to provide radio coverage in a coverage enhanced region.

8. A method according to claim 1, wherein said user equipment comprises a coverage extension machine type communication device.

9. A computer program product operable, when executed on a computer, to perform the method of claim 1.

10. A network node configured to control user equipment operation in a wireless communications network configured to support communication with said user equipment according to a communication mode which utilises repetition of messaging; said network node comprising:
    transmission regime logic configured to determine a modulation and coding regime to be used by said user equipment;
    repetition logic configured to identify an repetition regime to be implemented by said user equipment in conjunction with said modulation and coding regime; and
    communication logic configured to communicate an indication of said determined modulation and coding regime and identified repetition regime to said user equipment;
    wherein said indication comprises: an indication of an absolute number of repetitions to be performed; and
    wherein said indication comprises: an indication of a codebook entry giving the absolute number of repetitions to be performed.

11. A network node according to claim 10, in which said indication of said identified repetition regime is encoded using one or more bits of a modulation and coding regime control message.

12. A network node according to claim 10, wherein said indication further comprises: a modulation and coding regime to be applied.

13. A network node according to claim 10, wherein said repetition regime comprises a repetition regime to be applied in relation to uplink transmissions made by said user equipment.

14. A method of controlling user equipment operation in a wireless communications network configured to support communication with said user equipment according to a communication mode which utilises repetition of messaging; said method comprising:
- receiving an indication of a determined modulation and coding regime and identified repetition regime to be used by said user equipment;
- said modulation and coding regime to be used by said user equipment having been determined by a network control node; and said repetition regime to be implemented by said user equipment having been identified for use by said user equipment in conjunction said determined modulation and coding regime; and
- communicating in dependence upon said received indication;
- wherein said indication comprises: an indication of an absolute number of repetitions to be performed; and
- wherein said indication comprises: an indication of a codebook entry giving the absolute number of repetitions to be performed.

15. A computer program product operable, when executed on a computer, to perform the method of claim 14.

16. A method according to claim 14, in which said indication of said identified repetition regime is encoded using one or more bits of a modulation and coding regime control message.

17. A method according to claim 14, wherein said indication further comprises: a modulation and coding regime to be applied.

18. A method according to claim 14, wherein said repetition regime comprises a repetition regime to be applied in relation to uplink transmissions made by said user equipment.

19. User equipment configured to perform a control method in a wireless communications network configured to support communication with said user equipment according to a communication mode which utilises repetition of messaging; said user equipment comprising:
- reception logic configured to receive an indication of a determined modulation and coding regime and identified repetition regime to be used by said user equipment; said modulation and coding regime to be used by said user equipment having been determined by a network control node; and said repetition regime to be implemented by said user equipment having been identified for use by said user equipment in conjunction with said determined modulation and coding regime; and
- communication logic configured to transmit and/or receive communication in dependence upon said received indication;
- wherein said indication comprises: an indication of an absolute number of repetitions to be performed; and
- wherein said indication comprises; an indication of a codebook entry giving the absolute number of repetitions to be performed.

20. User equipment according to claim 19, in which said indication of said identified repetition regime is encoded using one or more bits of a modulation and coding regime control message.

21. User equipment according to claim 19, wherein said indication further comprises: a modulation and coding regime to be applied.

22. User equipment according to claim 19, wherein said repetition regime comprises a repetition regime to be applied in relation to uplink transmissions made by said user equipment.

23. User equipment according to claim 19, wherein said indication of said identified repetition regime is encoded using one or more bits of a downlink control information (DCI) message.

24. User equipment according to claim 19, wherein said indication of said identified repetition regime is encoded using one or more bits of resource allocation information in a downlink control information (DCI) message.

25. User equipment according to claim 19, wherein said indication of said identified repetition regime is encoded using one or more bits of scheduling information in a downlink control information (DCI) message.

\* \* \* \* \*